Patented July 11, 1939

2,165,732

UNITED STATES PATENT OFFICE 2,165,732

PROCESS FOR REMOVING CARBON DISULPHIDE FROM COKE-OVEN LIGHT OIL

Benjamin D. Sontag, Clairton, Pa.

No Drawing. Application October 17, 1936,
Serial No. 106,264

1 Claim. (Cl. 196—32)

This invention is the process for removing acidic sulphur compounds from organic fluids. It is particularly intended to effect the removal of carbondisulphide from coke-oven light oil or its fractions.

In the production of benzol or motor benzol of the strong acid washed grade, or the weak acid and anti-oxidant treated grade, it is usually necessary to reduce the carbon disulphide content. This may be done by fractionation, which is always accompanied by a loss of benzol. Previously known chemical processes are either impractical or uneconomical. The present invention provides a chemical process that has proven both practical and economical in actual operation.

According to the invention the product to be treated for the reduction or removal of carbon disulphide is contacted at atmospheric or higher temperatures with an ammonical solution of sodium or potassium hydroxide. The contacting is best accomplished by mechanical agitation in a suitable apparatus or by circulation of the solution through a quantity of the product to be treated or by circulation vice versa. The advantage of circulation methods is that an ordinary storage tank may be utilized for the process.

The use of sodium hydroxide is preferable because it is cheaper than potassium hydroxide. Experimentation has proved that these two hydroxides, at least, are equivalent in the process. It is possible that other hydroxides might be effective. Although strong solutions of sodium hydroxide and ammonia are more active than weaker solutions, it has been found that a solution containing from 5 to 20 per cent by weight of sodium hydroxide and from 5 to 20 percent by weight of ammonia gives very good results. As the ammonia and hydroxide are consumed, additions of either or both can be made to maintain the concentration desired. After the solution is used for some time the sodium salts increase to a point where the solution becomes viscous but, before the spent solution is disposed of, practically all of the ammonia can be utilized by maintaining the sodium hydroxide concentration above 7 percent by weight of the solution.

The process is applicable to both crude and refined products, but it is especially adaptable to the removal of carbon disulphide from the crude forerunnings or crude benzol in the production of weak acid and anti-oxidant treated motor benzol. When used in this connection, the crude forerunnings or crude benzol are treated with the previously described solution for the removal of carbon disulphide. This is followed by washing with water and weak acid of approximately 25 percent strength, after which the crude forerunnings or crude benzol are neutralized and distilled. Any of the well-known inhibitors of anti-oxidants are then added to stabilize the finished product.

I claim:

A process for removing carbon disulphide from coke-oven light oil or its fractions, including contacting the oil or fraction with a solution of from 5 to 20 percent ammonia by weight and from 5 to 20 percent sodium hydroxide by weight and finally utilizing substantially all the ammonia in said solution by maintaining the concentration of sodium hydroxide at 7 percent or more by weight.

BENJAMIN D. SONTAG.